US010272728B2

(12) United States Patent
Nelson et al.

(10) Patent No.: US 10,272,728 B2
(45) Date of Patent: *Apr. 30, 2019

(54) CENTRAL TIRE INFLATION SYSTEM ROTARY AIR UNION

(71) Applicants: Stemco Products, Inc., Charlotte, NC (US); Pursuit LLP, Sanger, TX (US)

(72) Inventors: Christopher A. Nelson, Harrisburg, SD (US); James LeClaire, Las Vegas, NV (US); Mark Gold, Hallsville, TX (US)

(73) Assignee: STEMCO PRODUCTS, INC., Charlotte, NC (US)

( * ) Notice: Subject to any disclaimer, the term of this patent is extended or adjusted under 35 U.S.C. 154(b) by 329 days.

This patent is subject to a terminal disclaimer.

(21) Appl. No.: 14/980,663

(22) Filed: Dec. 28, 2015

(65) Prior Publication Data

US 2016/0214442 A1    Jul. 28, 2016

Related U.S. Application Data

(63) Continuation of application No. 13/759,758, filed on Feb. 5, 2013, now Pat. No. 9,221,308.

(60) Provisional application No. 61/595,581, filed on Feb. 6, 2012.

(51) Int. Cl.
| B60C 23/10 | (2006.01) |
| B60C 23/00 | (2006.01) |
| B60C 29/00 | (2006.01) |
| B60B 19/08 | (2006.01) |
| B60B 37/00 | (2006.01) |

(52) U.S. Cl.
CPC ............ B60C 23/003 (2013.01); B60B 19/08 (2013.01); B60B 37/00 (2013.01); B60C 23/10 (2013.01); B60C 29/00 (2013.01)

(58) Field of Classification Search
CPC ....... B60B 7/00; B60B 7/0013; B60B 7/0012; B60C 23/00; B60C 23/001; B60C 23/002
USPC ......... 152/415–417; 301/108.1–108.2, 108.4
See application file for complete search history.

(56) References Cited

U.S. PATENT DOCUMENTS

| 839,626 A | 12/1906 | Nielsen |
| 1,016,896 A | 2/1912 | Rivers |
| 1,112,596 A | 10/1914 | Burggraf, Jr. |
| 1,794,900 A | 3/1931 | Hutchinson |
| 1,816,693 A | 7/1931 | Pippin |
| 1,904,073 A | 4/1933 | O'Connor et al. |

(Continued)

FOREIGN PATENT DOCUMENTS

CN          1306478 A       8/2001

*Primary Examiner* — Jason R Bellinger
(74) *Attorney, Agent, or Firm* — Perkins Coie LLP

(57) ABSTRACT

A central tire inflation system for maintaining tire inflation on a vehicle is provided. The central tire inflation system includes a rotary union assembly having a housing that is coupled to and rotates with the hubcap. The housing is rotationally coupled to a stationary shaft. A flexible torque transfer shaft is connected to the stationary shaft on one end and to an axle plug on the other end. The axle plug has a hub forming a bore where the hub is movable on a web of material. The flexible torque transfer shaft and hub have cooperative non-circular shapes to resist rotation. An air vent is provided in the rotary union assembly that is isolated from the lubrication area, which inhibits the pressurized air from the central tire inflation system from pressurizing the lubrication area.

20 Claims, 10 Drawing Sheets

(56) References Cited

U.S. PATENT DOCUMENTS

| | | | |
|---|---|---|---|
| 2,156,841 A | 5/1939 | Davis | |
| 2,715,430 A | 8/1955 | Lindeman | |
| 3,276,503 A * | 10/1966 | Kilmarx | B60C 23/003 152/417 |
| 4,387,931 A | 6/1983 | Bland | |
| 4,685,501 A | 8/1987 | Williams | |
| 5,240,039 A | 8/1993 | Colussi et al. | |
| 5,429,167 A | 7/1995 | Jensen | |
| 5,505,525 A * | 4/1996 | Denton | B60B 7/00 301/108.2 |
| 5,584,949 A | 12/1996 | Ingram | |
| 5,769,979 A | 6/1998 | Naedler | |
| 6,011,463 A * | 1/2000 | Cormier, Sr. | B60C 23/0433 340/442 |
| 6,105,645 A | 8/2000 | Ingram | |
| 6,145,559 A | 11/2000 | Ingram, II | |
| 6,244,316 B1 * | 6/2001 | Naedler | B60C 23/003 152/417 |
| 6,325,124 B1 | 12/2001 | Colussi et al. | |
| 6,425,427 B1 * | 7/2002 | Stech | B60C 23/003 152/415 |
| 6,484,774 B1 | 11/2002 | Naedler | |
| 6,561,168 B2 | 5/2003 | Hokao et al. | |
| 6,585,019 B1 | 7/2003 | Ingram | |
| 6,843,270 B1 | 1/2005 | Wang | |
| 7,207,365 B2 * | 4/2007 | Nelson | B60C 23/003 152/415 |
| 9,221,308 B2 * | 12/2015 | Nelson | B60C 23/003 |
| 2002/0124926 A1 * | 9/2002 | Colussi | B60C 23/003 152/417 |
| 2002/0153783 A1 | 10/2002 | Lau | |
| 2004/0238093 A1 | 12/2004 | Nelson et al. | |
| 2005/0133134 A1 * | 6/2005 | Ingram | B60C 23/003 152/417 |
| 2006/0113126 A1 * | 6/2006 | Durif | B62D 61/10 180/22 |
| 2006/0231184 A1 * | 10/2006 | Beverly | B60C 23/003 152/417 |
| 2008/0290659 A1 * | 11/2008 | Alexander | F16L 35/005 285/382.1 |

* cited by examiner

CENTRAL TIRE INFLATION SYSTEM ROTARY AIR UNION

CROSS-REFERENCE TO RELATED PATENT APPLICATIONS

This patent application is a continuation of U.S. patent application Ser. No. 13/759,758, filed Feb. 5, 2013, now U.S. Pat. No. 9,221,308, which claims priority to U.S. Provisional Patent Application Ser. No. 61/595,581, filed Feb. 6, 2012, both titled the same and both incorporated herein by reference as if set out in full.

FIELD

The technology of the present application relates to central tire inflation systems (hereinafter "CTIS") used to maintain the tire pressure of a vehicle in operation. More specifically, the technology of the present application provides rotary air unions used in supplying pressurized air to the rotating tires of trailers with hollow, non-drive axles.

BACKGROUND

This disclosure incorporates herein by reference, in its entirety, U.S. Pat. No. 7,207,365, entitled "Central Tire Inflation System Rotary Air Union."

Tire pressure maintenance is and has always been important to proper operation of a vehicle. The trucking industry has promoted this subject as a means to increase tire life and fuel economy, while reducing downtime and maintenance costs due to flat tires or the like. A tire blowout on the road can be unsafe for a number of different reasons, including difficulty controlling the vehicle as well as debris left on the roadway that can be hazardous to other drivers. Proper tire pressure can decrease the possibility of tire failures and may increase safe operation for the vehicle driver and other drivers on the road.

Various CTISs have been designed and are the subject of numerous patents that accomplish the objective of tire pressure maintenance. The most common systems in the heavy truck industry are designed for trailers. Heavy trucks typically include a tractor and a trailer. Often, the trailer axles are hollow with axle ends that commonly have a through bore. The hollow axle provides a conduit to supply air pressure to the wheel end. Delivery of air via a hose is more challenging for steer axles and drive axles in part due to typically solid spindles on steer axles and solid rotating shafts inside drive axles. In all cases, steer, driven, and trailer, the wheel end assembly includes a lubrication area between the axle and the wheel. This may require plugging the through bore in the axle end and covering the end of the axle with a hubcap attached to the wheel. The wheel is supported on the axle end by wheel bearings. The bearings require lubrication and the integrity of the lubrication area is essential in maintaining the operability and life of the wheel end assembly. In order to provide pressurized air to the rotating tires, the CTIS may include a rotary union in the same general location as the bearings. In most cases, the CTIS is in or adjacent to the lubrication area between the stationary axle and the wheel. The CTIS should not allow pressurized air into the lubrication area. Pressurized air in the lubrication area may cause the lubricating oil to be forced past the wheel seals by air pressure leading to bearing failure and consequently catastrophic wheel failure.

Two methods are commonly used to supply pressurized air to the end of a trailer axle, pressurize the axle itself, or use a smaller conduit, such as an air hose, inserted within the axle. In either case, the air pressure at the end of the axle is then communicated from the stationary axle to the rotating wheel by the use of a rotary union.

The rotary air union assembly in combination with a regulated air pressure source functions to deliver air from the stationary axle to one or more rotating tires. The regulated air pressure source uses vehicle air pressure typically supplied by the tractor's air compressor or the trailer's air pressure tanks, which may also provide a reservoir of air (or other gas) for operation of the pneumatic brakes. The regulated air pressure source for the CTIS may include a filter, a regulator, air tubing, and fittings. A flow or pressure sensor may be included to sense air supply to the tires. Also, an isolation valve may be provided to isolate the CTIS from the regulated air pressure source. If the CTIS includes a sensor, generally, a light is included to alert the driver or operator that the CTIS is supplying air to the tires, which often needs to be observed by the driver by use of the rearview mirror.

The primary seal within the rotary air union also takes many forms; a spring loaded face seal, o-ring seals, u-cup seals, or packing material seals. The primary seal is a key element of the rotary union; however, even in the best conditions, air can escape from the primary seal and pressurize the lubrication area. Vents to atmosphere have been disclosed including the vent chamber, vent passageway, and check valve, such as described in the above-referenced U.S. Pat. No. 7,207,365.

A further function of a typical rotary union is to supply air from the stationary axle to the rotating wheel and tire when misalignment between the two is present. Varied approaches to this challenge have been disclosed. In each case, the associated seals and connections are torque carrying elements between or within the stationary and rotating components of the rotary union. Prior solutions drive torque through o-ring seals, conduits, threaded connections, and fittings, for example. In the referenced patent, U.S. Pat. No. 7,207,365, a coupling is claimed to limit the application of rotational torque on the flexible conduit that is supplying air to the rotary union.

Tire pressure monitoring systems are available to sense, report, and optionally record the current status and pressure history of one or more tires. An example is the BAT RF® system provided by STEMCO LP of Longview, Tex. Various aspects of the present disclosure provide the ability to integrate a monitoring system into the maintenance system.

Thus, against the above background, it would be desirable to provide an improved device to couple the rotating and non-rotating parts of a CTIS system to reduce the effect of torque on the various components.

BRIEF DESCRIPTION OF THE DRAWINGS

The technology of the present application will be further explained with reference to the drawing figures referenced below, wherein like structures may be referred to by like numerals throughout the several views thereof.

While the above-identified drawing figures set forth one exemplary embodiment, other embodiments of the present invention are also contemplated, as noted throughout. The technology of the present application is described by way of representative examples and should not be construed as limiting. Numerous other modifications and embodiments within the spirit and scope of the technology of the present application are incorporated herein.

DETAILED DESCRIPTION

The technology described within the present application provides examples, and is not intended to limit the scope, applicability or configuration of the invention. Rather, the ensuing description will provide those skilled in the art with an enabling description for implementing embodiments of the technology. Various changes may be made in the function and arrangement of elements without departing from the spirit and the scope of the technology described herein.

Thus, various embodiments may omit, substitute, or add components as appropriate. For example, the technology may be described as incorporating a flexible tube. The single flexible tube may be replaced with metallic tubes, bores, or the like as appropriate. Additionally, methods of manufacturing and/or assembly may be disclosed, but the methods disclosed may be performed in an order different than that described, and that various steps may be added, omitted or combined. Also, aspects and elements described with respect to certain embodiments may be combined in various other embodiments. It should also be appreciated that the following systems, methods, and devices may individually or collectively be components of a larger system.

Figure 1:
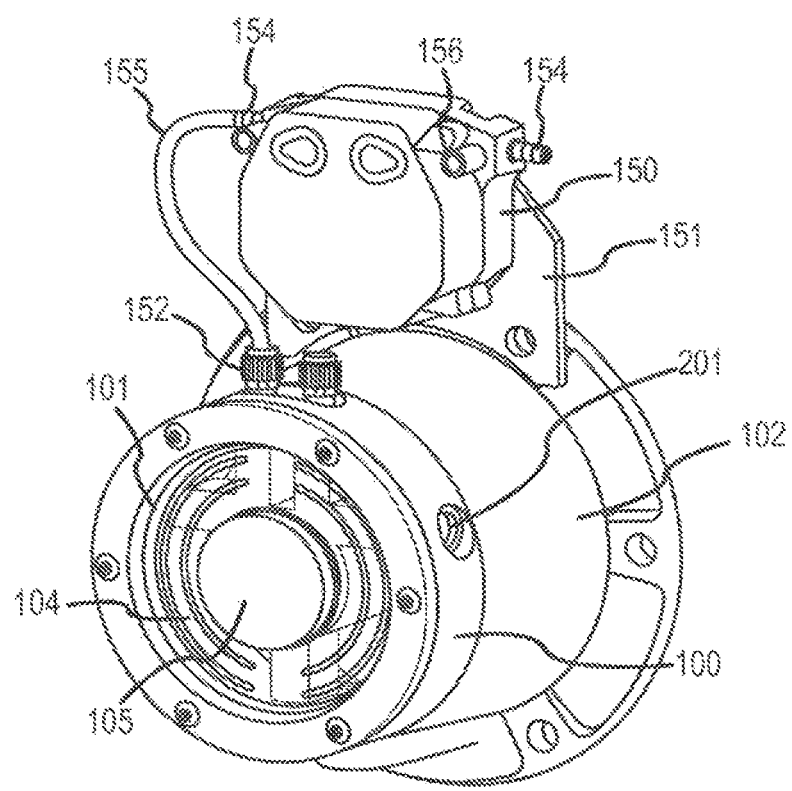
FIG. 1 is a perspective view of a rotary air union assembly and monitoring system consistent with the technology of the present application.

FIG. 1 illustrates a Rotary Air Union (RAU) Assembly 100 and Tire Pressure Monitoring System 150 according to an exemplary embodiment of the technology. The RAU Assembly 100 of FIG. 1 is mounted between the hubcap 102 and the sight window 104 (which may include a vent 105). The construction of the hubcap 102 and the sight window (with or without the vent 105) are generally known in the art and will not be further explained herein except where necessary to provide context of details about the technology of the present application. One exemplary sight window 104 includes the SENTINEL®, which is available from STEMCO LP located in Longview, Tex. The SENTINEL® provides a vent 105 for the lubrication area. The RAU Assembly 100 of this exemplary embodiment is coupled between the hubcap 102 and the sight window 104 and provides for a fluid path from the hubcap 102 to the sight window 104 as will be further described below. Notably, the fluid path of the RAU Assembly 100 allows for the sight window 104 and the vent assembly 105 to function in a conventional manner without modification.

As will become apparent on reading the present application, the RAU assembly 100 of FIG. 1 is "self-contained". In other words, the assembly may be sub-assembled (or preassembled) and later installed between the hubcap 102 and the sight window 104. The RAU assembly 100 may be designed to use existing seals, such as, for example, the hubcap seal 101 (shown better in FIG. 2) between the hubcap 102 and sight window assembly 104 to maintain a proven assembly in all vehicle applications.

Figure 2:
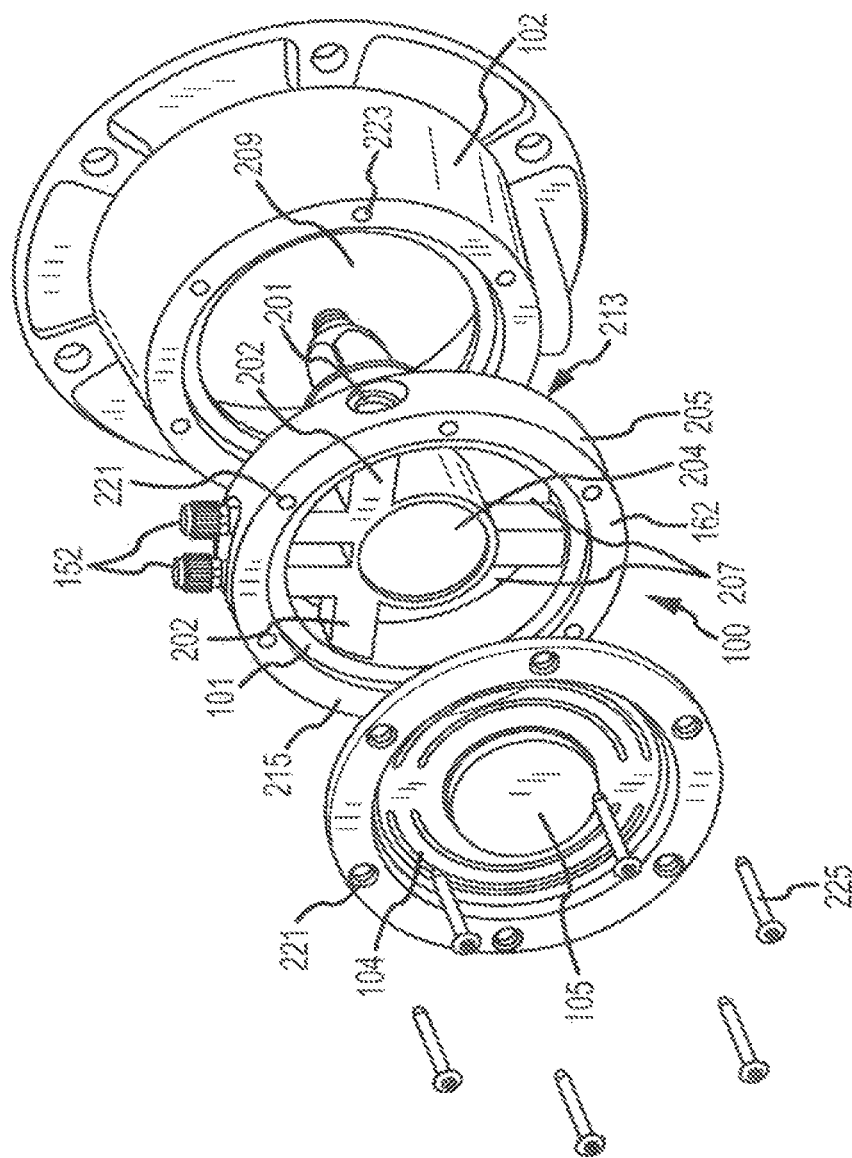
FIG. 2 is an exploded view of the rotary air union assembly of FIG. 1.

With reference to FIGS. 1 and 2, the RAU assembly 100 includes a housing 162. The housing 162 of this embodiment includes spokes 202 extending from a central hub 204. The spokes 202 define a fluid flow passage 201 (which may be called an airflow path) from the central hub 204 to the exterior surface 205 of the housing 162. Not shown herein, the fluid flow passage 201 would connect to a fitting, such as a brass air fitting, and a first end of a hose. The second end of the hose would be connected to, for example, the tire stem to provide a fluid (air) flow path from the axle to the tire. The housing 162, spokes 202, and central hub 204 define a plurality of lubrication flow passages 207 (best seen in FIG. 4). The lubrication flow passages 207 provide a fluid path for the lubrication from the lubrication cavity 209, which is defined by the interior space of the hubcap 102 and a vehicle side 213 of the housing 162, to the sight window lubrication cavity 211 (best seen in FIG. 3), which is defined by the sight window 104 and the sight window side 215 of the housing 162. The lubrication flow passages 207 allow lubrication fluid to flow from the lubrication cavity 209 to the sight window cavity 211 such that the lubrication level may be observed in the sight window 104. In other words, when the vehicle is not in operation (i.e., the wheels are not rotating), the lubrication fluid can freely pass to the sight window lubrication cavity 211 so the lubrication level of the lubrication cavity 209 can be checked with the sight window 104 in the normal course.

Additionally, the lubrication flow passages 207 provide a fluid communication path to the vent 105. Thus, if pressure builds in the lubrication area, the lubrication flow passages 207 allow the excessive pressure to vent from the lubrication cavity 209 through the lubrication flow passages 207 and the sight window lubrication cavity 211 and out the vent 105. As will be explained further below, the lubrication cavity 209, lubrication flow passages 207, the sight window lubrication cavity 211, and the vent 105 are sealed or isolated from the air conduits supplying pressurized air to the wheels.

With reference again to the embodiment of FIG. 1, the monitoring system 150 may be operably connected to the RAU assembly 100. One exemplary monitoring system 150 is BatRF®, which is available from STEMCO LP. The monitoring system 150 may be a separate unit mounted to the hubcap 102, such as with the flange 151 bolted to the hubcap 102 (the bolts are not shown). Alternatively, the monitoring system 150 may be integrated in or monolithic with the RAU assembly 100. In the exemplary embodiment shown, where the RAU assembly 100 and the monitoring system 150 are separate units, the RAU assembly includes one or more service ports 152, such as the two service ports 152 used in the exemplary embodiment shown in FIG. 1. The service ports 152 are connected to one or more pressure ports 154 of the monitoring system through a fluid conduit 155. Only one fluid conduit 155 is shown for clarity. The fluid conduit 155 may include, for example, a flexible tube along with appropriate fittings. The monitoring system 150 maintains this overall system function. When used, the monitoring system 150 has service ports 156.

As can be appreciated with reference to FIG. 2, the RAU assembly 100 and sight window 104 include bores 221 that align with each other and bores 223 in the hubcap 102. Bolts 225 are used to couple the sight window 104 and the housing 162 to the hubcap 102 in a conventional manner. As can now be appreciated, the RAU assembly 100 and monitoring system 150 provide for installation with existing parts and maintains current features and durability of existing hubcaps and seals.

Figure 3:
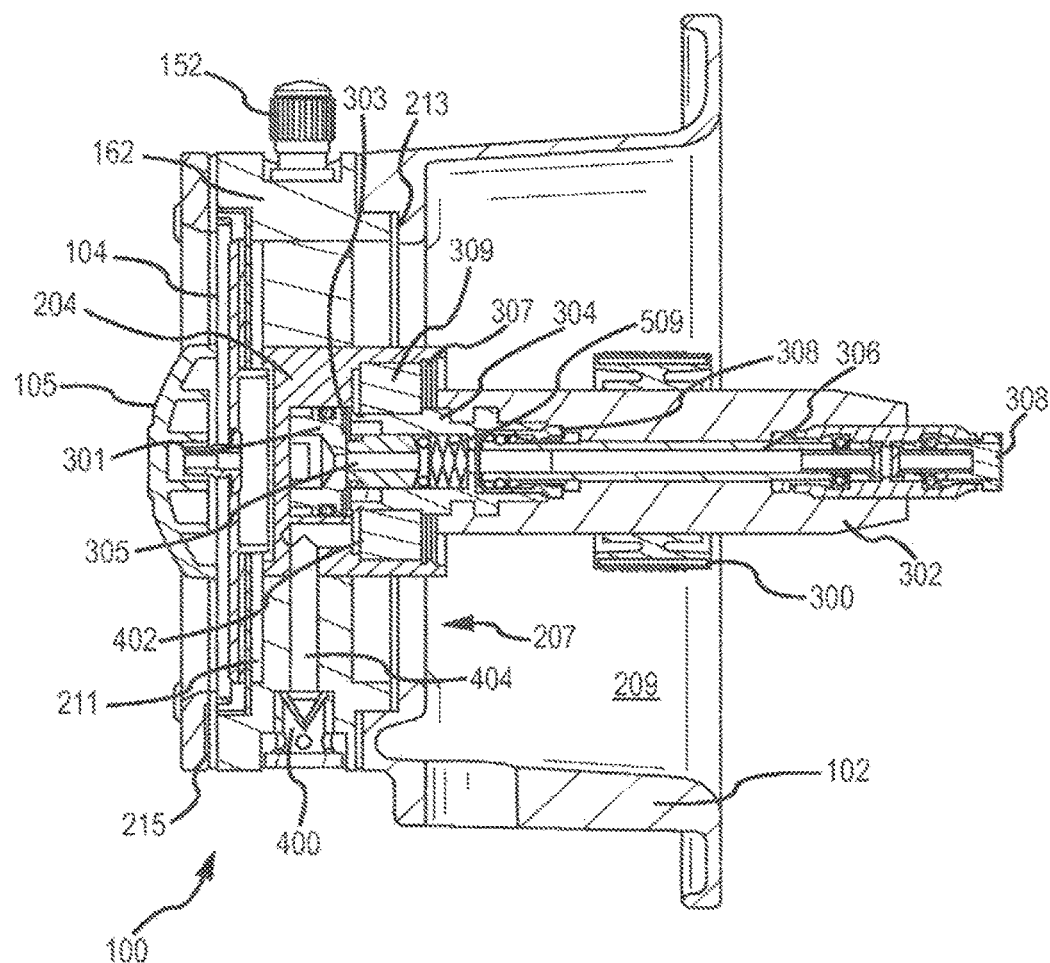
FIG. 3 is a cross-sectional view of the rotary air union assembly of FIG. 1.

FIG. 3 provides a cross-sectional view of the RAU assembly 100, the sight window 104, and the hubcap 102 in some additional detail. As can be seen in FIG. 3, the central hub 204 of the RAU assembly 100 includes a face seal 301 and a face seal retaining ring 303, and a bearing retaining ring 307. The face seal 301, face seal retaining ring 303, and bearing retaining ring 307 all cooperate to couple a flexible torque transfer shaft subassembly 550, described further below, and bearing 309 to the RAU assembly 100. The flexible torque transfer shaft 302, which will be explained further below with reference to FIG. 5, has a stationary shaft 304 that extends into the bearing 309. As can be appreciated, the hubcap 102, the RAU assembly 100, and the sight window 104 rotate with the wheel. The stationary shaft 304, however, is stationary and is not intended to rotate with the wheel. The rotation puts a torsional force on the stationary shaft 304. The flexible torque transfer shaft 302, however, has at least one air conduit 306 and a plurality of air fittings 308 that should not be subjected to torsional force if possible. The flexible torque transfer shaft 302, in combination with an axle plug 300, reduces the torsional forces on at least the air conduit 306 and the air fittings 308 (further defined below in connection with FIG. 5) as will be apparent below.

As mentioned above, and with reference to FIGS. 3 and 4, the lubrication cavity 209, lubrication flow passages 207, the sight window lubrication cavity 211, and the vent 105 are sealed from the air conduits supplying pressurized air to the wheels. To facilitate the isolation between the lubrication areas and the pressurized air areas, the present application provides an air vent 400 along a likely leak path. In particular, air may leak past, for example, the face seal 301 and the float seal 305. Any leakage may be contained in an air gap 402 between the bearing 309 and the vehicle side 213 of the housing 162. The air gap 402 is coupled to the air vent 400 by a vent passage 404. The air vent 400 includes a check valve and a protective fitting (shown but not specifically numbered). The check valve has a very low cracking pressure to avoid pressure build up in the RAU assembly 100 and to limit the ability for moisture to enter through the air vent 400.

Figure 4:
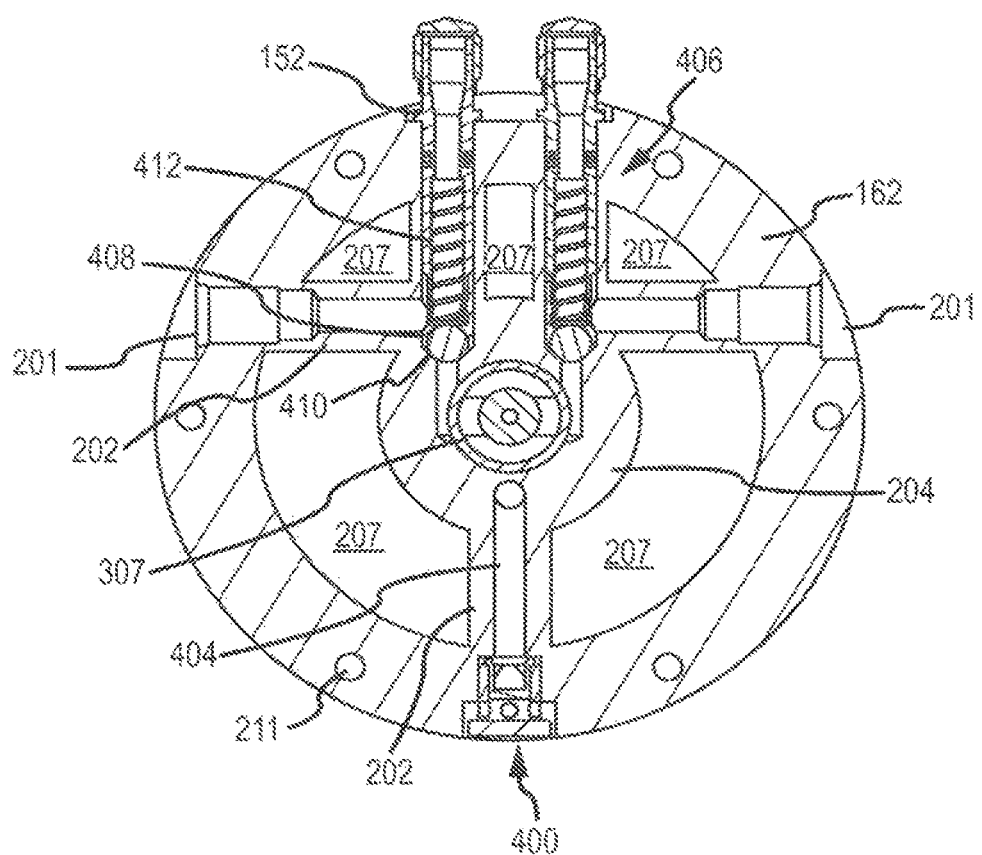
FIG. 4 is another cross-sectional view of the rotary air union assembly of FIG. 1.

As best shown in FIG. 4, the left and right fluid flow passages 201 allow air to flow from the central hub 204 through spokes 202. Left and right fluid flow passages 201 refer to the location on the drawing for convenience. As is clear the device rotates and the orientation of the fluid flow passages 201 rotates with the device. In any event, a pair of check valves 406 may be provided to isolate the fluid flow passages 201 of each tire from the other tire. The check valves 406 may be, for example, ball check valves including a ball 408 seated in a valve seat 410 by a spring 412.

Figure 5:
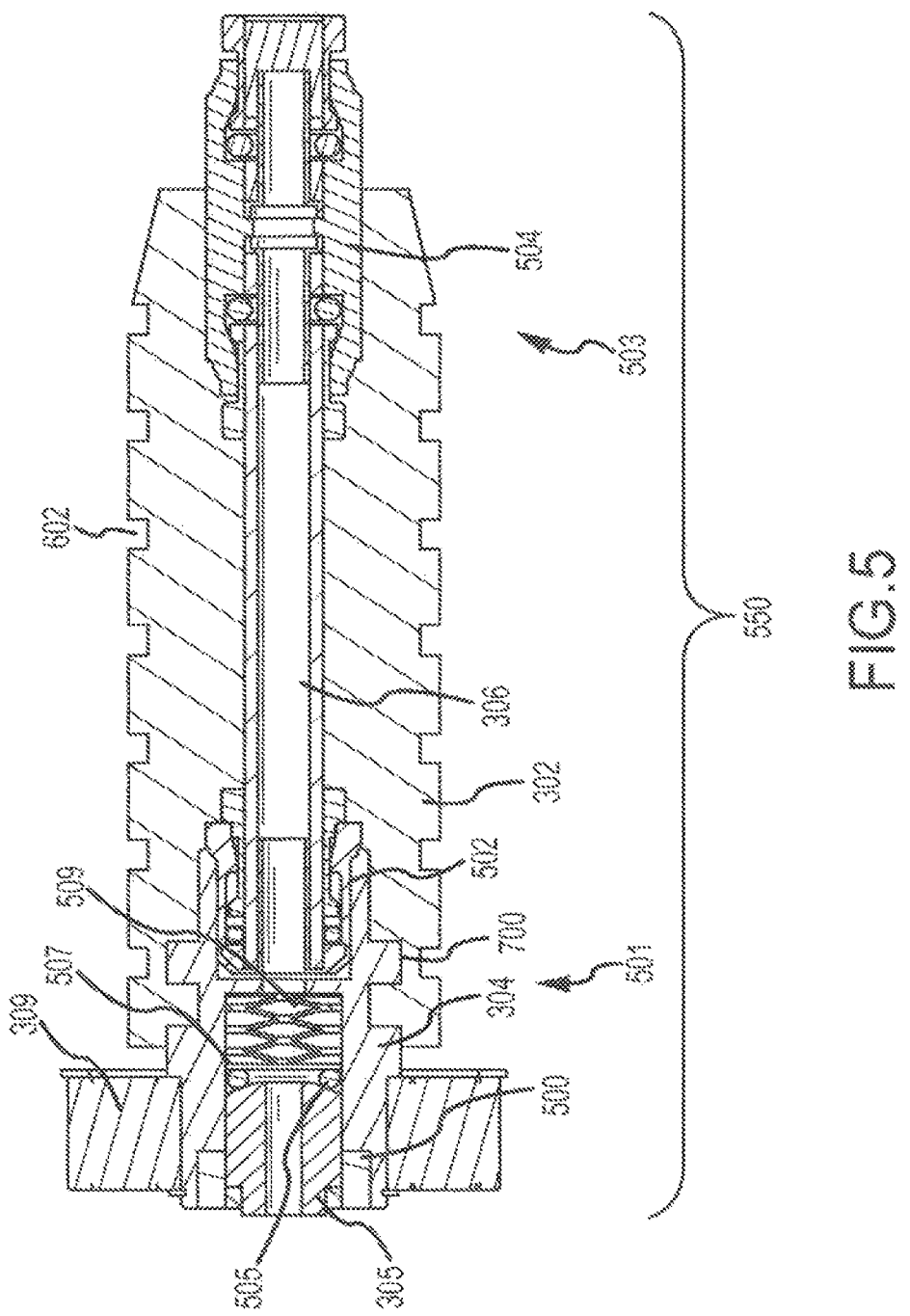
FIG. 5 is a cross-sectional view of the flexible torque transfer shaft of FIG. 3.

With reference now to FIG. 5, the flexible torque transfer shaft 302 will be described in more detail. For ease of reference, the flexible torque transfer shaft 302 will be explained from a RAU side 501 to an axle side 503. The RAU side 501 is downstream and the axle side 503 is upstream.

At the RAU side 501, the float seal 305 and a float seal bushing 500 are coupled to the stationary shaft 304 by a press fit connection or the like. As explained in more detail above, the face seal 301 cooperates with other elements to help retain the stationary shaft 304 in the bearing 309 and the RAU assembly 100. The bearing 309 allows the wheel (and the associated parts) to rotate while the stationary shaft 304 does not rotate. A float spring 509 provides a sealing force to the float seal 305, a float seal O-ring 505, and a float seal washer 507. The float seal spring 509 applies the sealing force, through the float seal washer 507 and O-ring 505, to the float seal 305 to inhibit air from leaking from the air supply to the air gap 402, which is shown in FIG. 3.

Figure 6:
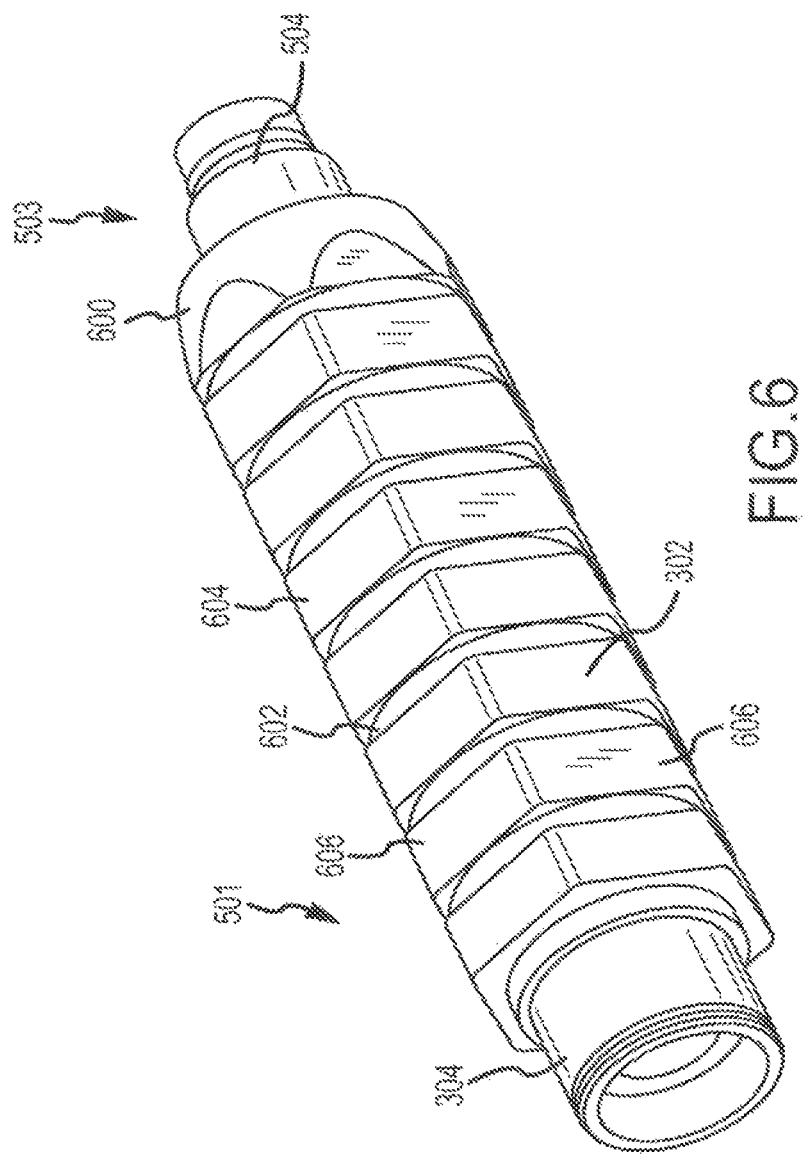
FIG. 6 is a perspective view of the flexible torque transfer shaft of FIG. 5.

Moving upstream from the stationary shaft 304 is a first air fitting 502. The first air fitting provides an airtight connection between the stationary shaft 304 and the air conduit 306. The air conduit traverses the flexible torque transfer shaft 302 to a second air fitting 504 at the axle side 503. The flexible torque transfer shaft 302 is formed by an elastomeric overmolding of a portion of the stationary shaft 304, the first air fitting 502, the air conduit 306, and a portion of the second air fitting 504. The flexible torque transfer shaft 302 inhibits the rotation of the stationary shaft 304 and transfers the torque along its length. A perspective view of the flexible torque transfer shaft 302 is shown in FIG. 6 from the RAU side 501 to the axle side 503. The upstream or axle side 503 of the flexible torque transfer shaft 302 may include a taper 600 or be beveled. The taper 600 may facilitate inserting the flexible torque transfer shaft 302 into the axle plug 300 (shown in FIG. 3 and described further below with reference to FIG. 8). As shown, the flexible torque transfer shaft 302 may be molded with channels 602, which may be categorized as cuts, perforations, or the like. The channels 602 increase the flexibility of the flexible torque transfer shaft. The elastomer forms a seal between the flexible torque transfer shaft 302 and the axle plug 300.

Figure 7:
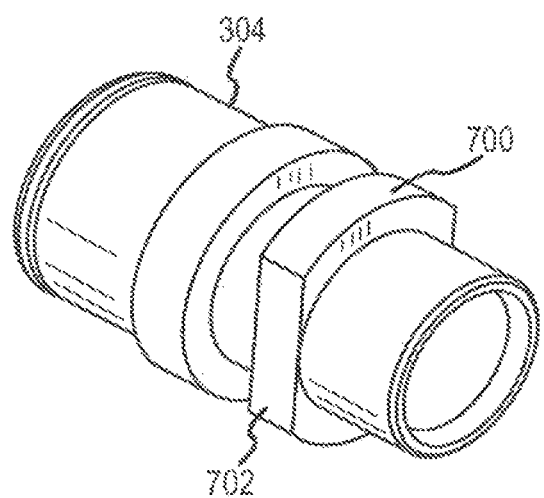
FIG. 7 is a perspective view of the stationary shaft of FIG. 3.

The outer surface 604 of the flexible torque transfer shaft may be molded to have a hexagonal shape, which includes a plurality of flat surfaces 606. The outer surface 604 could be molded with other polygonal or non-round shapes. The flat surfaces 606 are shaped to cooperatively engage the axle plug 300, which will be explained further below. The flat surfaces 606 when engaged with the axle plug 300 help inhibit rotation of the flexible torque transfer shaft 302. Further, with reference to FIG. 7, the stationary shaft 304 may include a locking interface 700 (shown in FIG. 5 as well). The locking interface 700 includes one or more flat surfaces 702. The flat surfaces 702 inhibit rotation of the stationary shaft 304 once the flexible torque transfer shaft 302 is molded over the locking interface 700.

Figure 8:
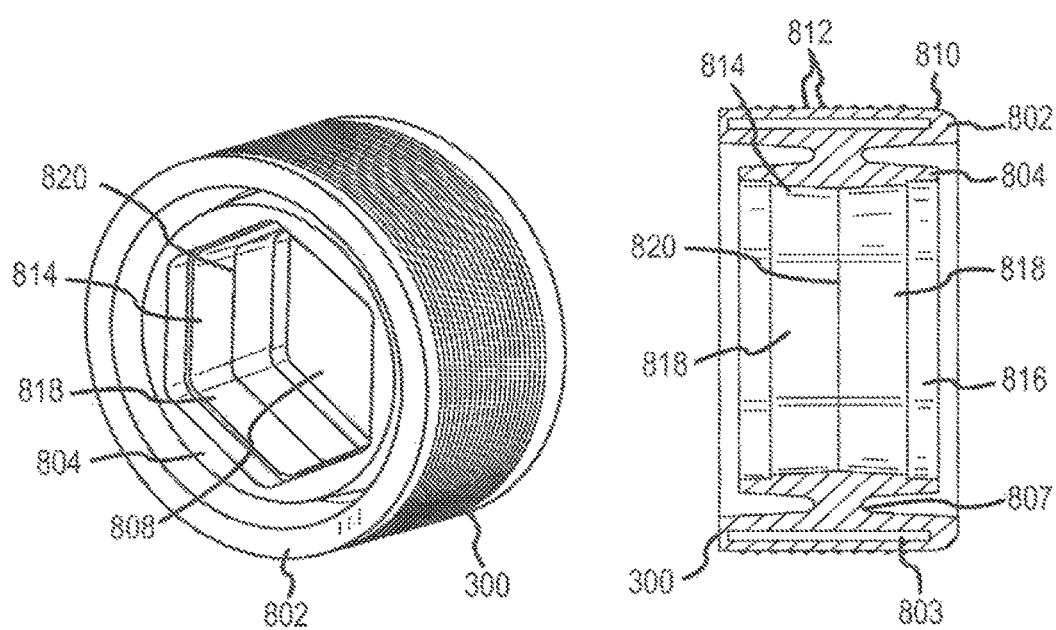
FIG. 8 is a perspective view and cross-sectional view of the axle plug of FIG. 3.

With reference to FIG. 8, the axle plug 300 will now be described. The axle plug 300 may be molded from an elastomer similar to the flexible torque transfer shaft 302. The elastomer may be the same or a different elastomer as long as they are sufficiently compatible to form a seal when the flexible torque transfer shaft 302 is coupled to the axle plug 300. As shown, the axle plug 300 includes an outer portion 802 that includes a steel tube 803 overmolded with an elastomer. The axle plug 300 also includes a hub 804 connected to the outer portion 802 by a web of elastomer 807 that allows the hub 804 to flex for misalignment between the torque transfer shaft 302 and the axle plug 300. The outer surface 810 of the outer portion 802 may include a plurality of protrusions 812. The protrusions 812 facilitate the seal between the axle and the axle plug 300 as well as facilitate the insertion of the axle plug 300 into the axle bore. The axle hub 804 has at least one rib 814 extending radially inward from the inner surface 816 of the hub 804. The rib 814, in this exemplary embodiment, has two sloped surfaces 818 converging to an apex 820. The sloped surfaces 818 facilitate alignment of the flexible torque transfer shaft 302 as the flexible torque transfer shaft 302 is moved through the bore 808 formed by the axle plug. The inner surface 818 and the rib 814 define the bore 808. The bore 808 is shaped to cooperatively engage the flexible torque transfer shaft 302. In this exemplary embodiment, the inner surface 818 forms a hexagonal shape similar to the outer surface 604. The hexagonal shape inhibits relative rotation between the axle plug 300 and the flexible torque transfer shaft 302.

The torque transfer shaft 302 slidingly engages the axle plug 300 to accommodate various axle/hubcap combinations. The elastomers may be reinforced with fibers, metals, or a combination thereof to provide strength as necessary. Additionally, the elastomer should provide for flexibility (to accommodate misalignment), strength (for torque transmission), and durability or corrosion resistance (for exposure to chemicals and heat).

Figure 9:
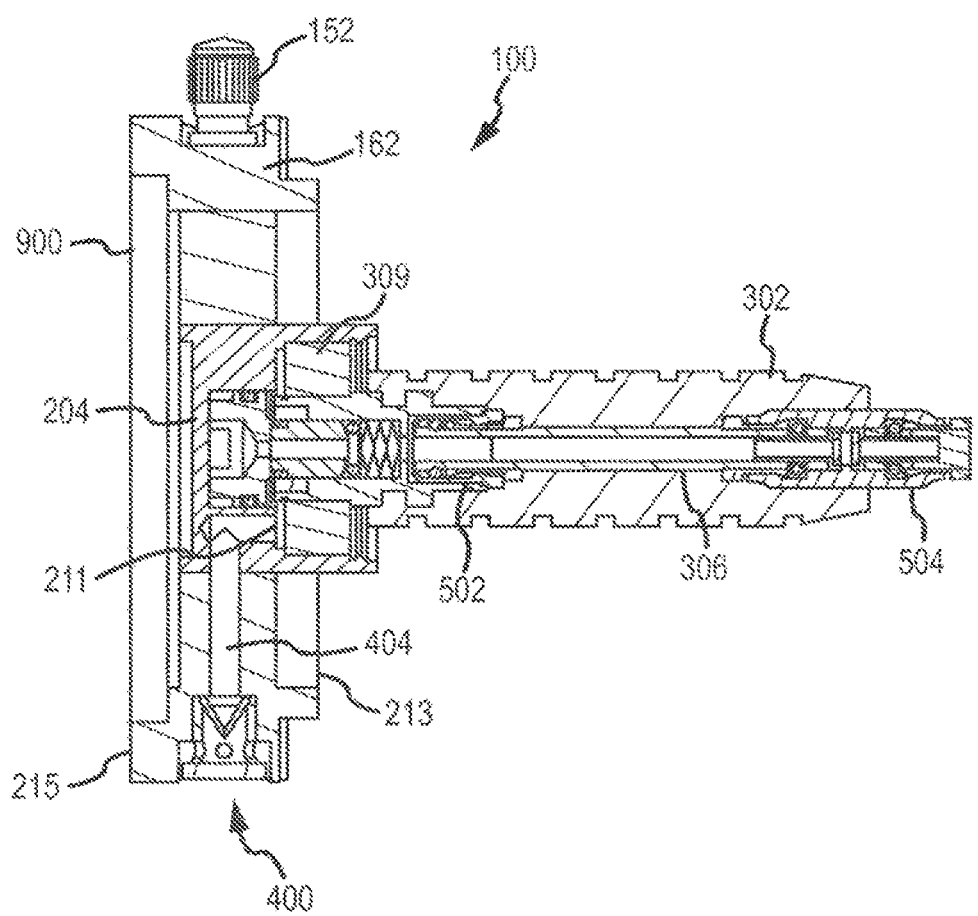
FIG. 9 is a sub-assembly of the rotary air union assembly and flexible torque transfer shaft.
Figure 10:
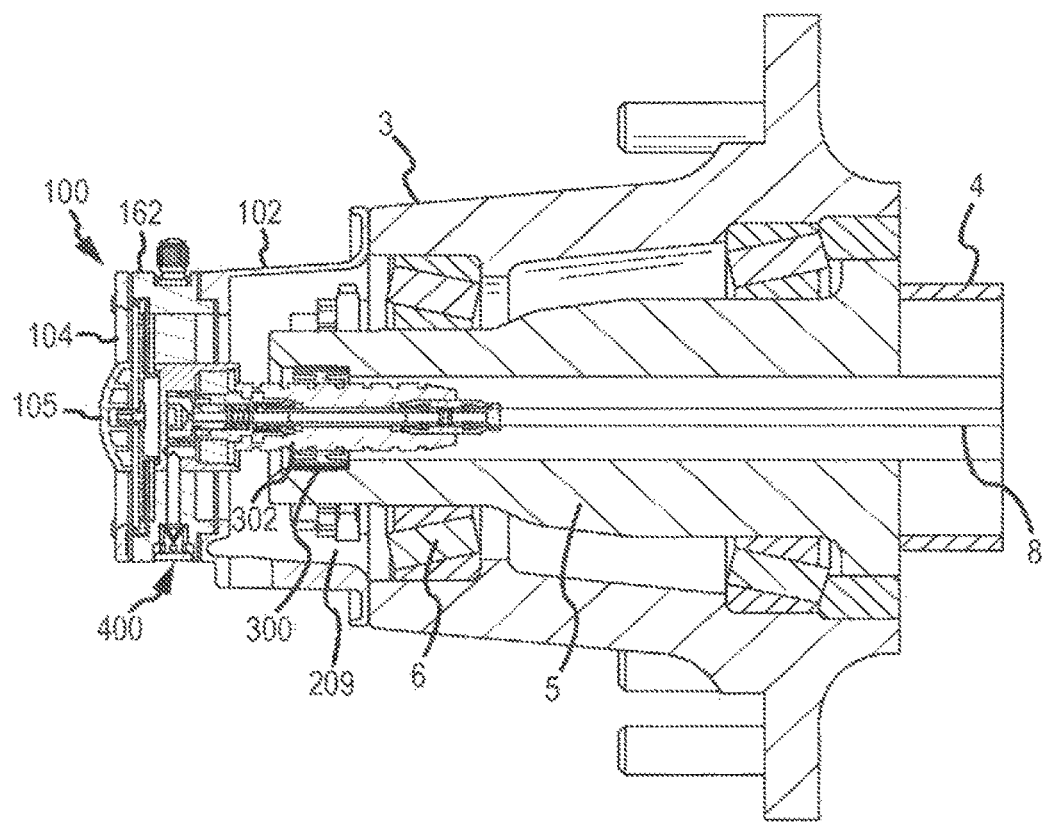
FIG. 10 is a cross-sectional view of the rotary air union assembly and flexible torque transfer shaft coupled to an axle.

With reference to FIG. 9, a cross-sectional view of the RAU assembly 100 and flexible torque transfer shaft 302 is shown. As best shown in FIG. 9, the RAU housing 162 includes a recess 900 to fit the sight window 104 (not shown in FIG. 9). With reference to FIG. 10, the RAU assembly 100 and flexible torque transfer shaft 302 are shown as installed in a wheel end. As can be appreciated, the RAU assembly 100 is coupled to the hubcap 102. The hubcap 102 is mounted on the wheel end 3 of a tire that is mounted on a stationary, hollow axle 4. An axle spindle 5 provides a common rotary connection, which uses wheel end bearings 6, between the wheel end 3 and the spindle 5. The axle plug 300 extends from the axle spindle 5 to receive the flexible torque transfer shaft 302. An air conduit 8, shown in FIG. 10, extends through the stationary, hollow axle 4 and couples to the air fitting 504 on the upstream end of the flexible torque transfer shaft 302.

As explained above, and summarized here, the flexible torque transfer shaft 302 and axle plug 300 may limit the application of rotational torque on seals, conduits, and fittings. The torque transfer shaft 302 and axle plug 300 further have a slideable engagement that allows use across different axle/hubcap configurations with similar parts. In other words, a single combination of the RAU assembly 100, the flexible torque shaft 302, and the axle plug 300 may be used with multiple hubcaps. The flexible axle plug 300 and the flexible torque transfer shaft 302 each, and in combination, accommodate misalignment between the axle and the RAU 100. The flexible torque transfer shaft 302 provides a non-round and flexible shaft. The flexible torque transfer shaft subassembly 550 provides an airtight high pressure air conduit 306 through the lubrication area of the hubcap.

It should be noted that the methods, systems and devices discussed above are intended merely to be examples. It must be stressed that various embodiments may omit, substitute, or add various components as appropriate. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details.

Having described several embodiments, it will be recognized by those of skill in the art that various modifications, alternative constructions, and equivalents may be used without departing from the spirit of the invention. For example, the above elements may merely be a component of a larger system. Accordingly, the above description should not be taken as limiting the scope of the invention.

We claim:

1. A central tire inflation system for maintaining tire inflation on a vehicle, the central tire inflation system comprising:
    an axle plug shaped to cooperatively engage a hollow axle of the vehicle, the axle plug having a bore;
    a flexible torque transfer shaft having an upstream end shaped to cooperatively engage the bore of the axle plug and a downstream end opposite the upstream end, the flexible torque transfer shaft comprising an air conduit extending from the upstream end to the downstream end and an overmolding;
    a rotary air union assembly comprising a stationary shaft and a housing rotatably coupled to the stationary shaft, wherein the flexible torque transfer shaft overmolding couples the flexible torque transfer shaft and the stationary shaft; and
    a fluid flow path contained in the housing of the rotary air union assembly and in fluid communication with the air conduit.

2. The central tire inflation system of claim 1 wherein the axle plug comprises a cylindrical tube outer portion comprising an overmold.

3. The central tire inflation system of claim 2 wherein the axle plug further comprises a hub having an inner surface defining the bore, and a web connecting the hub to the cylindrical tube outer portion, wherein the web allows the hub to move with respect to the cylindrical tube outer portion.

4. The central tire inflation system of claim 3, wherein the inner surface comprises a non-round shape and the flexible torque transfer shaft has an outer surface shaped to cooperatively engage the non-round shape such that the non-round shape of the inner surface and the outer surface of the flexible torque transfer shaft together resist rotation.

5. The central tire inflation system of claim 4 wherein the non-round shape is a polygon.

6. The central tire inflation system of claim 3 wherein the inner surface comprises a rib.

7. The central tire inflation system of claim 6 wherein the rib comprises at least two surfaces that extend inwardly from the inner surface and converge at an apex.

8. The central tire inflation system of claim 1 wherein the flexible torque transfer shaft overmolding comprises a plurality of channels.

9. The central tire inflation system of claim 1 wherein the fluid flow path comprises a first fluid flow path to a first tire and a second fluid flow path to a second tire.

10. The central tire inflation system of claim 9 wherein the first fluid flow path and the second fluid flow path are isolated from each other by a plurality of check valves.

11. The central tire inflation system of claim 1 wherein the housing comprises a plurality of spokes extending inwardly from the housing that are coupled to a central hub and the stationary shaft extends from the central hub.

12. The central tire inflation system of claim 11 wherein the housing comprises an air vent and at least one of the plurality of spokes defines an air vent passage.

13. An apparatus configured for coupling to a hubcap and a hollow axle to place a fluid source in communication with a tire, the apparatus comprising:
    a rotary union assembly to couple to the hubcap of a vehicle, the rotary union assembly comprising: a housing to couple to the hubcap, a plurality of spokes formed with the housing and extending radially inwardly from the housing, a central hub coupled to the plurality of spokes, a stationary shaft coupled to and extending from the central hub in a direction toward the hollow axle, and a fluid flow passage extending through the stationary shaft into the central hub and through at least one of the plurality of spokes to an outer surface of the housing, wherein the housing of the rotary union assembly comprises at least one lubrication flow passage formed by the housing, the plurality of spokes, and the central hub wherein the lubrication flow passage is isolated from the fluid flow passage; and a flexible torque transfer shaft, the flexible torque transfer shaft coupled to the stationary shaft and comprising: an air conduit having an upstream side and a downstream side, the downstream side in fluid communication with the fluid flow passage, and an elastomer overmold covering the air conduit and at least a portion of the stationary shaft, wherein the elastomer overmold resists rotation of the stationary shaft.

14. The apparatus of claim 13, further comprising an axle plug sized to cooperatively engage the hollow axle, the axle plug defining a bore shape such that the flexible torque transfer shaft slidably engages the bore.

15. A vehicle having at least one wheel and a central tire inflation system comprising:

a hubcap defining a lubrication cavity;

a sight window defining a sight glass lubrication cavity, the sight window comprising a lubrication cavity vent;

a rotary union assembly residing between and coupled to the hubcap and the sight window, the rotary union assembly having a housing defining an outer circumference and a plurality of spokes extending radially inward from the housing to a central hub, the rotary union comprising a plurality of lubrication flow passages formed by the housing, plurality of spokes, and central hub such that the lubrication cavity and the sight window lubrication cavity are in fluid communication;

a flexible torque transfer shaft having a rotary union assembly side coupled to the rotary union assembly and an axle side opposite the rotary union assembly side, the flexible torque transfer shaft comprising an air conduit;

an axle plug to cooperatively engage an axle of the vehicle and a bore sized to slidingly engage the flexible torque transfer shaft; and an air path is contained in the air conduit and the rotary union assembly to place an air source in fluid communication with a tire.

16. The vehicle of claim 15 further comprising a tire pressure monitoring system in fluid communication with the air path.

17. The vehicle of claim 16 wherein the rotary union assembly comprises at least one service port and the tire pressure monitoring system comprises at least one pressure port in fluid communication with the at least one service port.

18. A vehicle having at least one wheel and a central tire inflation system comprising:

a hubcap defining a lubrication cavity;

a sight window defining a sight window lubrication cavity, the sight window comprising a lubrication cavity vent;

a pressure monitor coupled to the hubcap;

a rotary union assembly residing between and coupled to the hubcap and the sight window, the rotary union assembly having a housing defining an outer circumference and a plurality of spokes extending radially inward from the housing to a central hub, the rotary union comprising a plurality of lubrication flow passages formed by the housing, plurality of spokes, and central hub such that the lubrication cavity and the sight window lubrication cavity are in fluid communication;

a flexible torque transfer shaft having a rotary union assembly side coupled to the rotary union assembly and an axle side opposite the rotary union assembly side, the flexible torque transfer shaft comprising an air conduit;

an axle plug to cooperatively engage an axle of the vehicle and a bore sized to slidingly engage the flexible torque transfer shaft; and an air path is contained in the air conduit and the rotary union assembly to place an air source in fluid communication with a tire and the pressure monitor.

19. The vehicle of claim 16 wherein the tire pressure monitoring system is coupled to a hubcap of the vehicle.

20. The vehicle of claim 18 wherein the pressure monitor is coupled to a hubcap of the vehicle.

* * * * *